US007769007B2

(12) United States Patent
Lee et al.

(10) Patent No.: US 7,769,007 B2
(45) Date of Patent: Aug. 3, 2010

(54) METHOD OF PROVIDING MULTICAST SERVICES IN VIRTUAL PRIVATE LAN

(75) Inventors: Kyeseon Lee, Daejeon (KR); Tae Il Kim, Daejeon (KR); Hae Won Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 872 days.

(21) Appl. No.: 11/635,559

(22) Filed: Dec. 8, 2006

(65) Prior Publication Data

US 2007/0133529 A1    Jun. 14, 2007

(30) Foreign Application Priority Data

Dec. 8, 2005   (KR) ...................... 10-2005-0120048
Aug. 21, 2006  (KR) ...................... 10-2006-0078795

(51) Int. Cl.
    *H04L 12/54*   (2006.01)
(52) U.S. Cl. ..................... 370/389; 370/392; 370/401; 370/428
(58) Field of Classification Search ................. 370/389, 370/390, 392, 400, 401, 428, 465, 466
    See application file for complete search history.

(56) References Cited

U.S. PATENT DOCUMENTS

| 7,006,499 | B2 * | 2/2006 | Tingle et al. ................. 370/392 |
| 7,298,705 | B2 * | 11/2007 | Shankar et al. ............. 370/249 |
| 7,339,929 | B2 * | 3/2008 | Zelig et al. .................. 370/390 |
| 7,447,212 | B2 * | 11/2008 | Hu ............................. 370/395.3 |
| 7,593,400 | B2 * | 9/2009 | Zelig et al. .................. 370/392 |
| 7,619,966 | B2 * | 11/2009 | Lee ............................. 370/218 |
| 2005/0027782 | A1 | 2/2005 | Jalan et al. |
| 2006/0002370 | A1 * | 1/2006 | Rabie et al. ................. 370/351 |
| 2006/0109802 | A1 * | 5/2006 | Zelig et al. .................. 370/258 |

FOREIGN PATENT DOCUMENTS

KR    1020050063207    6/2005

OTHER PUBLICATIONS

Notice of Allowance for Korean app. 10-2006-0078795.

\* cited by examiner

*Primary Examiner*—Pankaj Kumar
*Assistant Examiner*—Duc T Duong
(74) *Attorney, Agent, or Firm*—Lowe Hauptman Ham & Berner LLP

(57) ABSTRACT

A method of providing multicast services in a virtual private local area network (LAN) is provided. The method of providing multicast services, which is used by a provider edge in a virtual private LAN in which the provider edge, a customer edge, and a management system are connected to each other, includes: establishing a VPLS table used to transmit a received Ethernet frame to a destination; after receiving an Ethernet frame from the customer edge, searching the VPLS table in order to determine whether or not group information related to the destination of the Ethernet frame exists in the VPLS table; if the group information does not exist, requesting the group information from the management system, receiving the information, and then, updating the VPLS table by adding the received group information; and determining an output interface by referring to the group information, and transmitting the Ethernet frame. According to the method, when multicast traffic, such as Internet protocol (IP) broadcasting, is transmitted in a VPLS network, the VPLS management system for managing groups of customers is linked, thereby solving the problem that multicast traffic is transmitted to unauthorized customers.

10 Claims, 6 Drawing Sheets

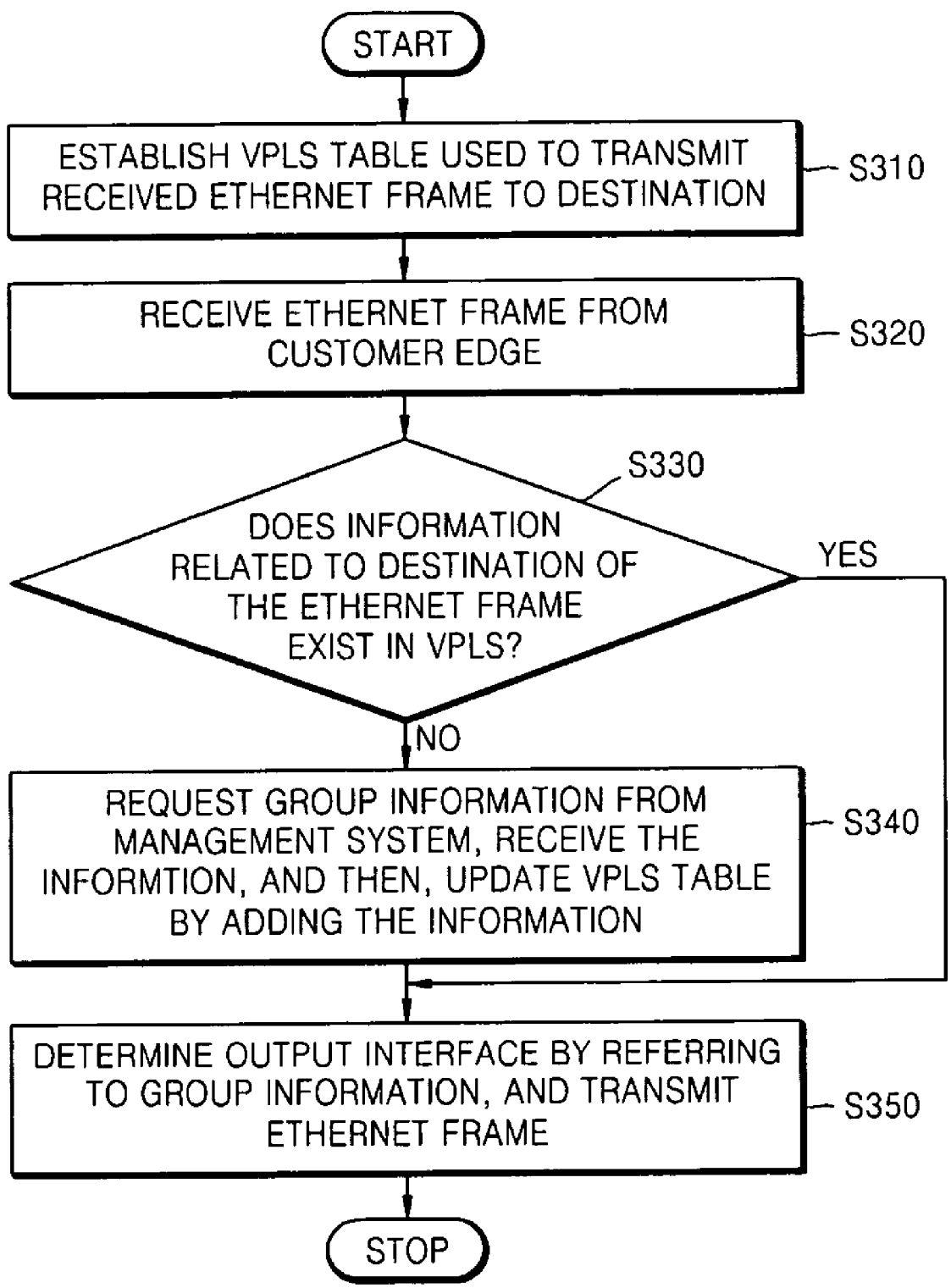

METHOD OF PROVIDING MULTICAST SERVICES IN VIRTUAL PRIVATE LAN

CROSS-REFERENCE TO RELATED PATENT APPLICATIONS

This application claims the benefits of Korean Patent Application No. 10-2005-0120048, filed on Dec. 8, 2005, and Korean Patent Application No. 10-2006-0078795, filed on Aug. 21, 2006, in the Korean Intellectual Property Office, the disclosures of which are incorporated herein in their entirety by reference.

BACKGROUND OF THE INVENTION

1. Field of the Invention

The present invention relates to a method of providing multicast services to customers by using a virtual private local area network service (VPLS) group management system for managing multicast customers in a virtual private local area network (LAN) service.

2. Description of the Related Art

A virtual private local area network service (VPLS) is a virtual private network service that can provide multipoint services to customers through a domain in which a network provided by a service provider is connected with a single huge bridge. The VPLS services allows a plurality of geographically dispersed sites to operate as if they were connected to one Ethernet local area network (LAN), thereby establishing a VPLS network which operates as if the entire VPLS network is a huge L2 switch.

If an Ethernet frame is received by a provider edge (PE) of a provider network, it is examined whether or not forwarding information related to the destination media access control (MAC) address of the received Ethernet frame is registered in the VPLS table of the PE, and if it is not registered, a MAC flooding and running process is performed, thereby updating the VPLS table. The received Ethernet frame is forwarded using the updated information.

Since this VPLS service provides a multipoint connection, the service provider can provide a multicast service to a customer by establishing only a VPLS network.

However, since the VPLS table is managed only by referring to an Ethernet frame at layer 2, an Internet protocol (IP) packet using an Internet group management protocol (IGMP) at layer 3 cannot be processed. Accordingly, multicast traffic is transmitted even to unauthorized customers.

SUMMARY OF THE INVENTION

The present invention provides a method of providing Internet protocol (IP)-based multicast services to authorized customers by using a system separately managing a multicast group.

According to an aspect of the present invention, in a provider edge in a virtual private local area network (LAN) in which the provider edge, a customer edge, and a management system are connected to each other and operated, there is provided method of providing multicast services including establishing a virtual private LAN service (VPLS) table used to transmit a received Ethernet frame to a destination; after receiving an Ethernet frame from the customer edge, searching the VPLS table in order to determine whether or not group information related to the destination of the Ethernet frame exists in the VPLS table; if the group information does not exist, requesting the group information from the management system, receiving the information, and then, updating the VPLS table by adding the received group information; and determining an output interface by referring to the group information, and transmitting the Ethernet frame.

According to another aspect of the present invention, there is provided method of providing multicast services in a virtual private LAN in which a provider edge, a customer edge, and a management system are connected to each other and operated, the method including: establishing a management table used to transmit a received Ethernet frame to a destination; and if a group information request is received from the provider edge, and if the request is appropriate, transmitting the group information to the provider edge.

According to another aspect of the present invention, there is provided a method of providing multicast services in a virtual private LAN in which the provider edge, a customer edge, and a management system are connected to each other and operated, the method including: the provider edge establishing a VPLS table used to transmit a received Ethernet frame to a destination, and the management system establishing a management table used to accurately transmit the Ethernet frame to the destination; after the provider edge receives an Ethernet frame from the customer edge, searching the VPLS table in order to determine whether or not group information related to the destination of the Ethernet frame exists in the VPLS table; if the group information does not exist, requesting the group information from the management system, receiving the information, and then, updating the VPLS table by adding the received group information; and the provider edge determining an output interface by referring to the group information, and transmitting the Ethernet frame.

BRIEF DESCRIPTION OF THE DRAWINGS

The above and other features and advantages of the present invention will become more apparent by describing in detail exemplary embodiments thereof with reference to the attached drawings in which:

FIG. 3 is a flowchart illustrating a process performed by a customer edge (CE) in a method of providing multicast services in a virtual private LAN according to an embodiment of the present invention;

DETAILED DESCRIPTION OF THE INVENTION

Figure 1:
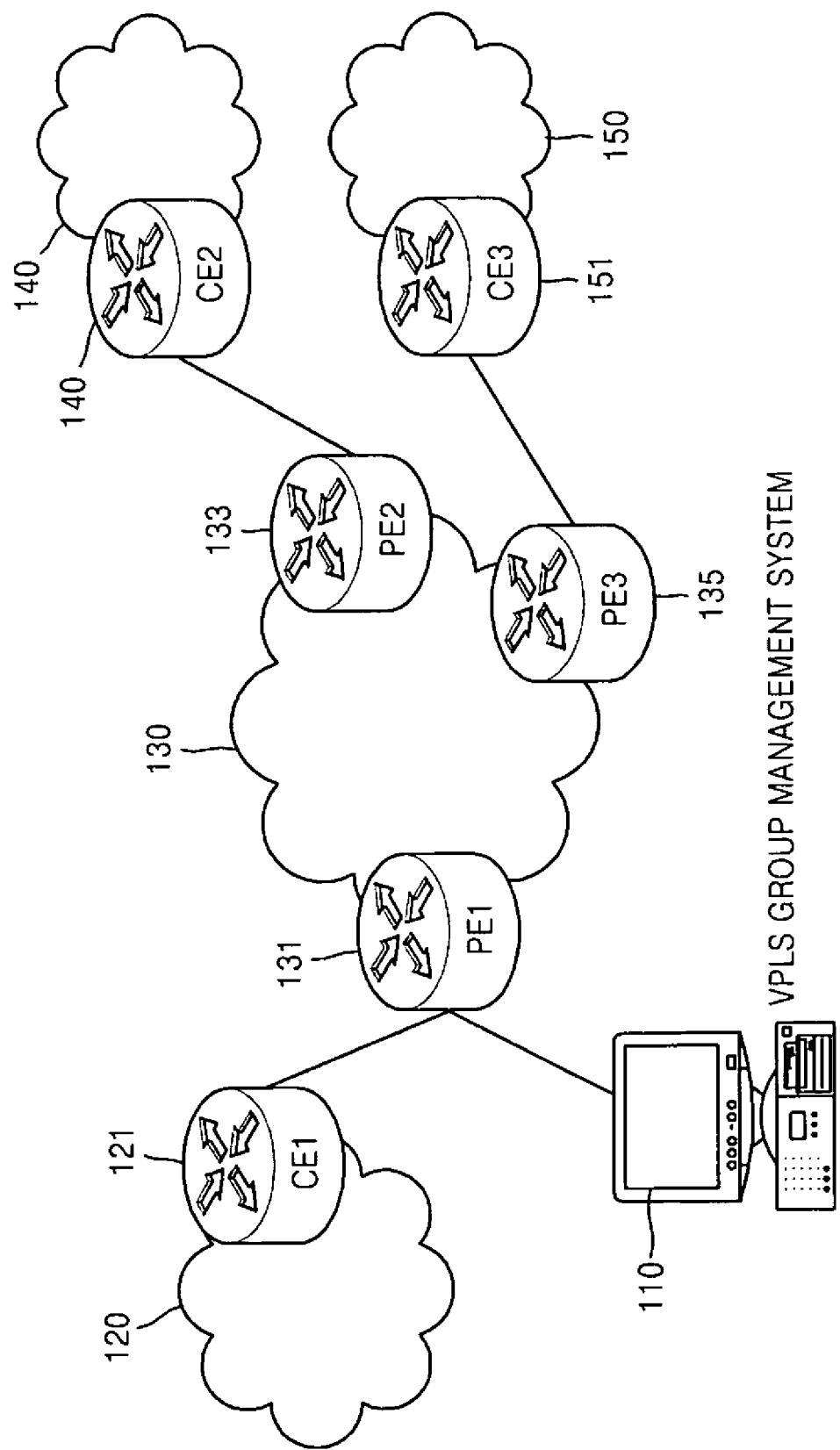
FIG. 1 is a diagram illustrating an example of establishing a network to which a method of providing multicast services in a virtual private local area network (LAN) according to an embodiment of the present invention is applied.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In explanation of the present invention, if it is determined that explanation on related known structures or functions may unnecessarily make the scope of the present invention unclear, the detailed explanation will be omitted. In the drawings, whenever the same element reappears in subsequent drawings, it is denoted by the same reference numeral.

Figure 2A:
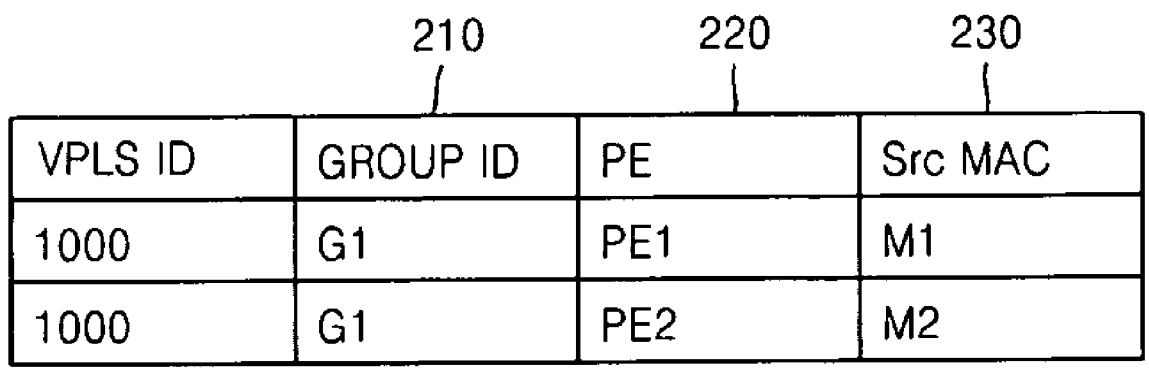
FIG. 2A is a diagram illustrating data managed in a virtual private LAN service (VPLS) group management system illustrated in FIG. 1 according to an embodiment of the present invention.
Figure 2B:
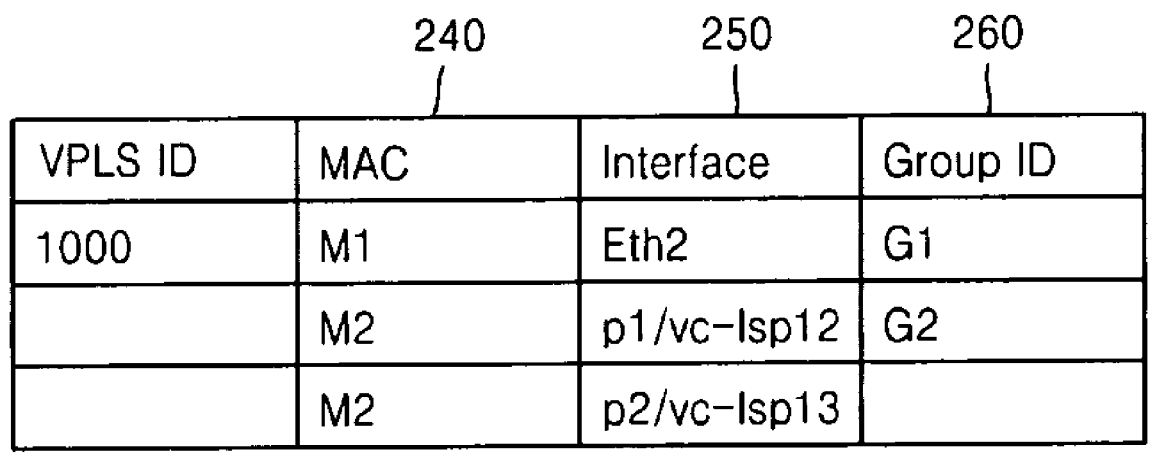
FIG. 2B is a diagram illustrating data managed in a provider edge (PE) illustrated in FIG. 1 according to an embodiment of the present invention.
Figure 4:
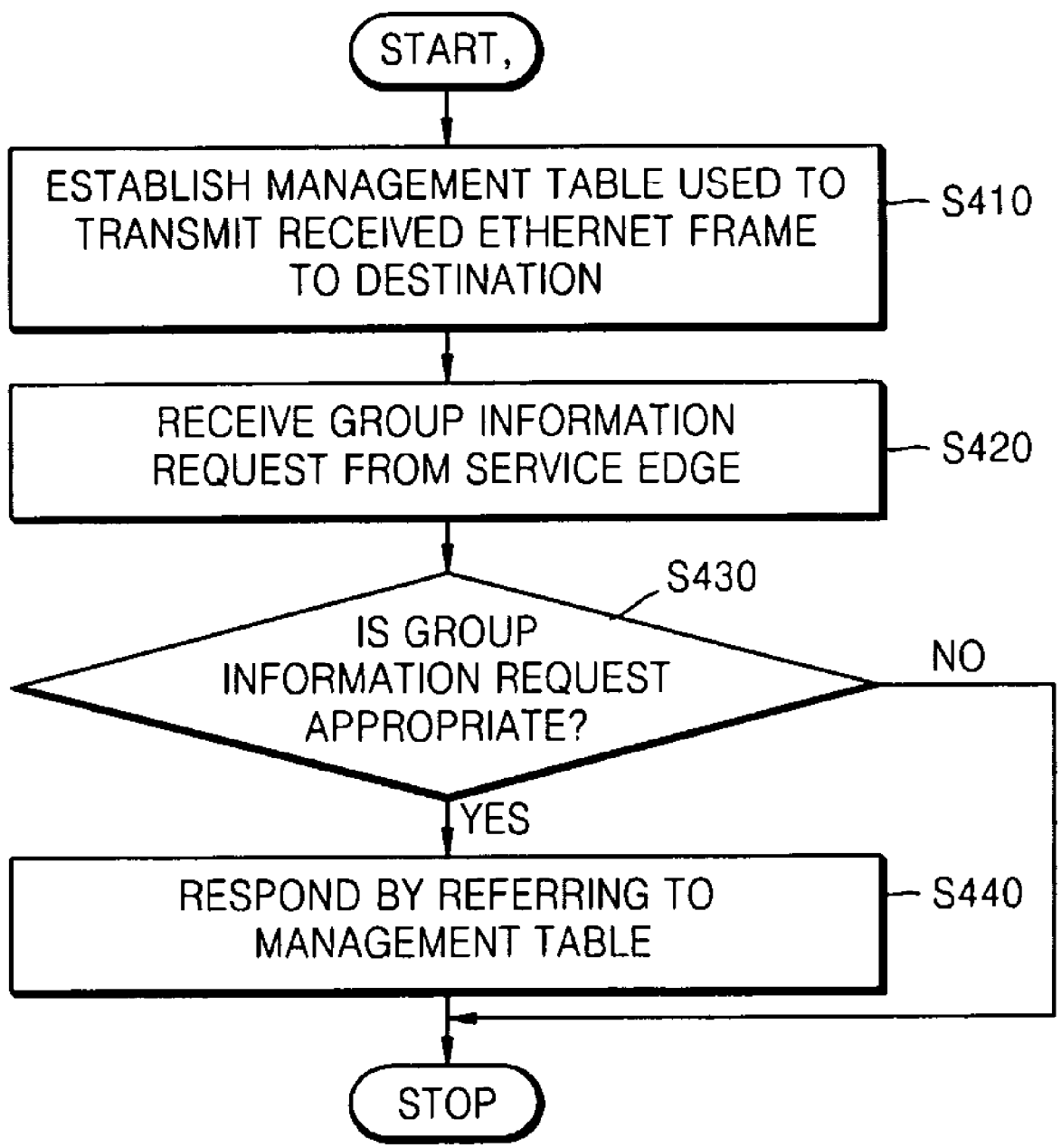
FIG. 4 is a flowchart illustrating a process performed by a management system in a method of providing multicast services in a virtual private LAN according to an embodiment of the present invention.
Figure 5:
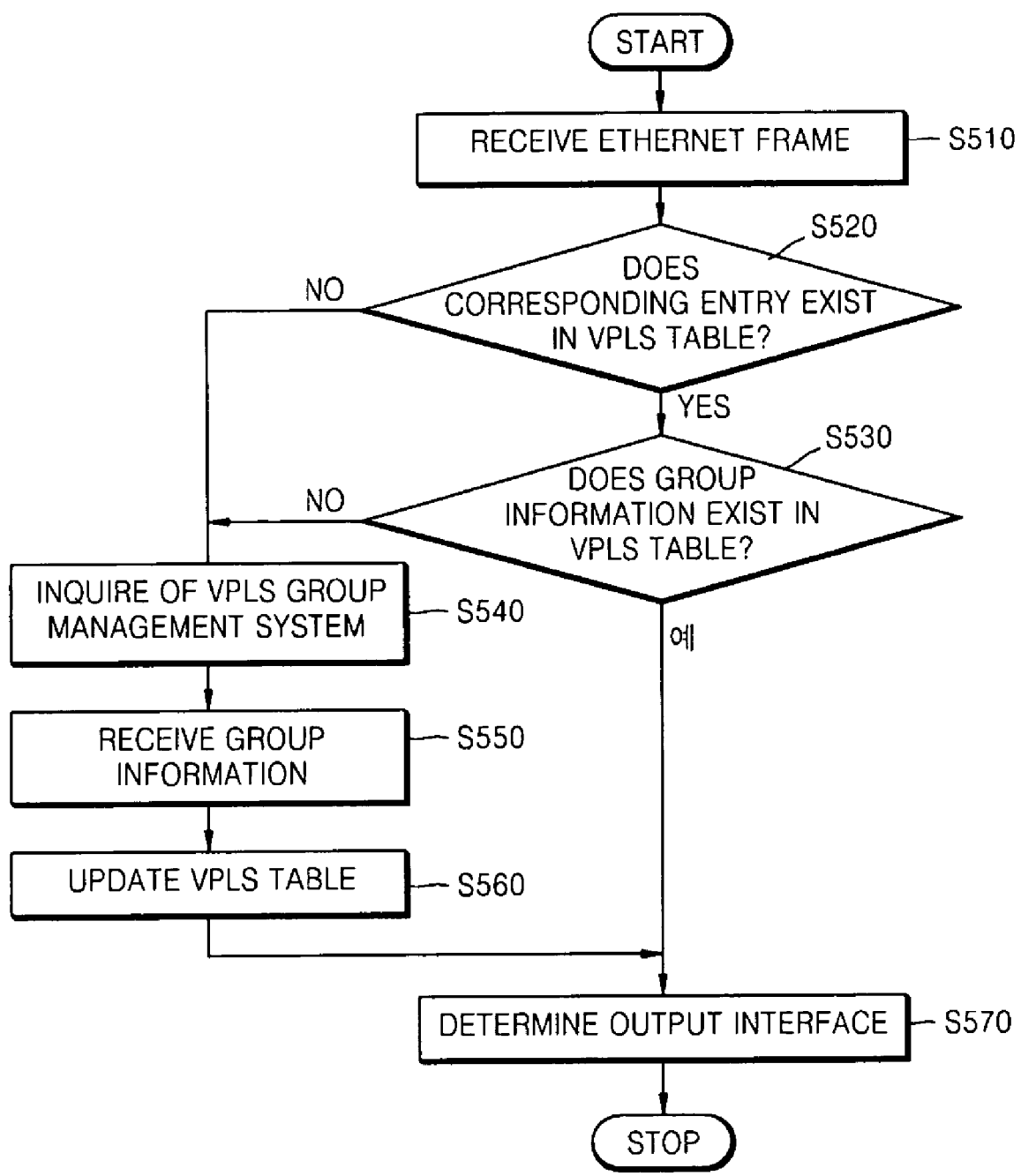
FIG. 5 is a flowchart illustrating overall operations of a method of providing multicast services in a virtual private LAN according to an embodiment of the present invention.
Figure 6:
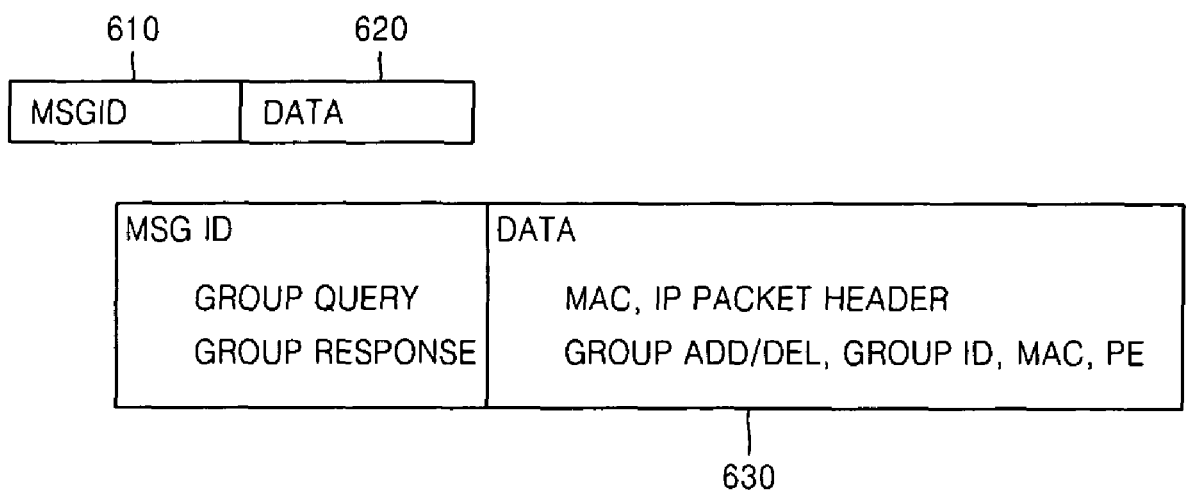
FIG. 6 is a diagram illustrating a message transmitted and received between a PE and a VPLS group management system according to an embodiment of the present invention.

FIG. 1 is a diagram illustrating an example of establishing a network to which a method of providing multicast services in a virtual private local area network (LAN) according to an embodiment of the present invention is applied. FIG. 2A is a diagram illustrating data managed in a virtual private LAN service (VPLS) group management system illustrated in FIG. 1 according to an embodiment of the present invention, and FIG. 2B is a diagram illustrating data managed in a provider edge (PE) illustrated in FIG. 1 according to an embodiment of the present invention. FIG. 3 is a flowchart illustrating a process performed by a customer edge (CE) in a method of providing multicast services in a virtual private LAN according to an embodiment of the present invention, and FIG. 4 is a flowchart illustrating a process performed by a management system in a method of providing multicast services in a virtual private LAN according to an embodiment of the present invention. FIG. 5 is a flowchart illustrating the overall operation of a method of providing multicast services in a virtual private LAN according to an embodiment of the present invention and FIG. 6 is a diagram illustrating a message transmitted and received between a PE and a VPLS group management system according to an embodiment of the present invention.

First, referring to FIG. 1, a VPLS network is composed of a network 130 provided by a service provider and a plurality of customer networks 120, 140 and 150. The network 130 provided by the service provider includes provider edges (provider network termination apparatuses), PE1 131, PE2 133, and PE3 135, which are connected to customer networks 120, 140, and 150, respectively. The customer networks 120, 140, and 150 include customer edges (customer network termination apparatuses), CE1 121, CE2 141, and CE3 151, respectively, which are connected to the provider network 130.

L2 Ethernet frames of each of the customer networks 120, 140, and 150 are transmitted to the PEs (PE1 131, PE2 133, and PE3 135) connected to the CEs (CE1 121, CE2 141, and CE3 151). The PEs (PE1 131, PE2 133, and PE3 135) each determine an output port and an output label for the destination of the data, by referring to a VPLS table, which will be explained later, and without modifying the data received from the CEs (CE1 121, CE2 141, and CE3 151), attach a virtual circuit (VC) label and a tunnel label, to the data, and transmit the data. The data is transferred to another PE of the provider network with the tunnel label exchanged, and the VC label is checked in a PE_that is a termination apparatus of the provider network, thereby determining an output to a CE and transferring the data. When the data is received, the CE receives the data transmitted by the transmitter CE without changing the data.

If a group ID does not exist in the forwarding information of the destination in the VPLS table, the PEs (PE1 131, PE2 133, and PE3 135) request a VPLS group management system 110 to send the group ID.

The table illustrated in FIG. 2A is generated in the VPLS group management system illustrated in FIG. 1. If received data is an Internet control message packet (ICMP), the table is formed with entries of group information 210, the MAC address 220 of a source, and the address 230 of a PE transmitting the data. Then, all PEs of a table having identical group information 210 are notified of customers in the identical group.

The table illustrated in FIG. 2B is generated in a PE illustrated in FIG. 1 (for example, PE1). By referring to the data received from the VPLS group management system 110, group information 260 is recorded, and a table with entries of the MAC address 240 of a source and the type of an interface 250 is generated.

The operations of the PE and the management system 100 based on this table will now be explained with reference to FIGS. 3 through 5.

First, the operation of the PE will be explained.

The PE operating in a virtual private LAN in which PEs, CEs, and the management system are connected to each other and operated as illustrated in FIG. 1 establishes a VPLS table used to transmit a received Ethernet frame to a destination, as illustrated in FIG. 2B in operation S310. Then, an Ethernet frame from the CE is received in operation S320, and it is determined whether or not group information 260 related to the destination of the Ethernet frame exists in the VPLS table in operation S330.

If the group information does not exist, the PE requests the management system 110 for the group information, receives the group information, and updates the VPLS table by adding the group information in operation S340.

Then, by referring to the group information, the PE determines a type of output interface, and transmits the Ethernet frame in operation S350. This is also performed when the group information related to the destination exists in operation S330.

A process performed in the management system 110 will now be explained.

First, the management system 110 establishes a management table, as illustrated in FIG. 2A, used to transmit a received Ethernet frame to a destination of the Ethernet frame in a virtual private LAN as illustrated in FIG. 1 in operation S410.

Then, the management system 110 receives a group information request from a PE in operation S420, and determines whether or not the request is appropriate in operation S430.

At this time, it is determined whether or not the group information request of the PE is related to an ICMP packet received by the PE, and if so, the management system 110 transmits the corresponding group ID 210 in the management table to the PE, and then, notifies all CEs having the group ID 210 in the management table of customers in the identical group. Finally, the management system 110 transmits the group information to the PE in operation S440 and finishes the process.

The overall operation of a method of providing multicast services in a virtual private LAN according to an embodiment of the present invention will now be explained with reference to FIG. 5 illustrating the overall operation.

First, if a PE receives an Ethernet frame from a CE in operation S510, it is determined in operation S520 whether or not the entry corresponding to the frame, including group information as described above, exists in a VPLS table.

If the entry exists in the VPLS table, it is determined in operation S530 whether or not the group information exists.

If both the entry and the group information exist, an output interface is determined and forwarding is performed in operation S570. If the entry or the group information does not exit in the VPLS table, a VPLS group management system 110 is requested to send the group information in operation S540.

If the received inquiry data is an ICMP packet, the VPLS group management system 110 updates the group information by referring to the table illustrated in FIG. 2A, and transfers the group information to all PEs belonging to the group in operation S550. The PE receiving the group information from the VPLS group management system 110 updates the VPLS table in operation S560. According to the updated table information, the PE determines an output interface and performs forwarding in operation S570.

FIG. 6 is a diagram illustrating a message transmitted and received between a PE and a VPLS group management system according to an embodiment of the present invention.

The message is formed with a message ID field 610 and a data field 620. A specific example is the message indicated by reference number 630.

A message with a message ID of a group query is used by a PE to ask the VPLS group management system 110 for group information, and includes the MAC address and IP packet header of an Ethernet frame received from a CE by a PE. A message with a message ID of a group response is used by the VPLS group management system 110 to transfer group information to PEs, and includes group add/delete information according to an ICMP message, and a group ID, a MAC and PE addresses.

According to the method of providing multicast services in a virtual private LAN of the present invention, when multicast traffic such as Internet protocol (IP) broadcasting is transmitted in a VPLS network, the VPLS management system for managing groups of customers is linked, thereby solving the problem that multicast traffic is transmitted to unauthorized customers.

The present invention can also be embodied as computer readable codes on a non-transistor computer readable recording medium. The non-transistor computer readable recording medium is any data storage device that can store data which can be thereafter read by a computer system. Examples of the non-transistor computer readable recording medium include read-only memory (ROM), random-access memory (RAM), CD-ROMs, magnetic tapes, floppy disks, and optical data storage devices. The non-transistor computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. In a provider edge in a virtual private local area network (LAN) in which the provider edge, a customer edge, and a management system are connected to each other, a method of providing multicast services comprising:

establishing a virtual private LAN service (VPLS) table used to transmit a received Ethernet frame to a destination;

after receiving an Ethernet frame from the customer edge, searching the VPLS table in order to determine whether or not group information related to the destination of the Ethernet frame exists in the VPLS table;

if the group information does not exist, requesting the group information from the management system, receiving the information, and then, updating the VPLS table by adding the received group information; and determining an output interface by referring to the group information, and transmitting the Ethernet frame;

wherein the requesting, receiving and updating of the group information comprise:

determining whether or not the group information request of the provider edge relates to the ICMP packet received by the provider edge;

if the request relates to the ICMP packet, transmitting to the provider edge a corresponding group ID in the management table; and notifying all customer edges having an identical group ID in the management table of customers in the identical group.

2. The method of claim 1, wherein in the establishing of the VPLS table, the VPLS table is established with an entry of information including an identification (ID) of the management system, a media access control (MAC) address, an interface, and a group ID.

3. A method of providing multicast services in a virtual private LAN in which a provider edge, a customer edge, and a management system are connected to each other and, the method comprising:

establishing a management table used to transmit a received Ethernet frame to a destination; and if a group information request is received from the provider edge, and if the request is appropriate, transmitting the group information to the provider edge;

wherein the transmitting of the group information to the provider edge comprises:

determining whether or not the group information request of the provider edge relates to an Internet control message packet (ICMP) received by the provider edge;

if the request relates to the ICMP packet, transmitting to the provider edge a corresponding group ID in the management table; and notifying all customer edges in the management table having an identical group ID of customers in the identical group.

4. The method of claim 3, wherein in the establishing of the management table, the management table is established with an entry of information including an ID of the management system, a provider edge connected to the management system, MAC address of a source transmitting a frame to the provider edge, and group information.

5. A method of providing multicast services in a virtual private LAN in which a provider edge, a customer edge, and a management system are connected to each, the method comprising:

the provider edge establishing a VPLS table used to transmit a received Ethernet frame to a destination, and the management system establishing a management table used to accurately transmit the received Ethernet frame to the destination;

after the provider edge receives an Ethernet frame from the customer edge, searching the VPLS table in order to determine whether or not group information related to the destination of the Ethernet frame exists in the VPLS table;

if the group information does not exist, requesting the group information from the management system, receiving the information, and then, updating the VPLS table by adding the received group information; and the provider edge determining an output interface by referring to the group information, and transmitting the Ethernet frame;

wherein the requesting, receiving and updating of the group information comprise:

determining whether or not the group information request of the provider edge relates to the ICMP packet received by the provider edge;

if the request relates to the ICMP packet, transmitting to the provider edge a corresponding group ID in the management table; and notifying all customer edges having an identical group ID in the management table of customers in the identical group.

6. The method of claim 5, wherein the provider edge establishes the VPLS table with an entry of information including an ID of the management system, a MAC address, an interface, and a group ID.

7. The method of claim 5, wherein the management system establishes the management table with an entry of information including an ID of the management system, a provider edge connected to the management system, a MAC address of a source transmitting a frame to the provider edge, and group information.

8. In a provider edge in a virtual private LAN in which the provider edge, a customer edge, and a management system are connected to each, a method of providing multicast services realized as a computer program stored in a non-transitory computer readable recording medium, the method comprising:

establishing a VPLS table used to transmit a received Ethernet frame to a destination;

after receiving an Ethernet frame from the customer edge, searching the VPLS table in order to determine whether or not group information related to the destination of the Ethernet frame exists in the VPLS table;

if the group information does not exist, requesting the group information from the management system, receiving the information, and then, updating the VPLS table by adding the received group information; and determining an output interface by referring to the group information, and transmitting the Ethernet frame;

wherein the requesting, receiving and updating of the group information comprise:

determining whether or not the group information request of the provider edge relates to the ICMP packet received by the provider edge;

if the request relates to the ICMP packet, transmitting to the provider edge a corresponding group ID in the management table; and notifying all customer edges having an identical group ID in the management table of customers in the identical group.

9. A non-transitory computer readable recording medium having embodied thereon a computer program for executing a method of providing multicast services in a virtual private LAN in which a provider edge, a customer edge, and a management system are connected to each other, wherein the method comprises:

establishing a management table used to transmit a received Ethernet frame to a destination; and if a group information request is received from the provider edge, and if the request is appropriate, transmitting the group information to the provider edge;

wherein the transmitting of the group information to the provider edge comprises:

determining whether or not the group information request of the provider edge relates to an Internet control message packet (ICMP) received by the provider edge;

if the request relates to the ICMP packet, transmitting to the provider edge a corresponding group ID in the management table; and notifying all customer edges in the management table having an identical group ID of customers in the identical group.

10. A non-transitory computer readable recording medium having embodied thereon a computer program for executing a method of providing multicast services in a virtual private LAN in which a provider edge, a customer edge, and a management system are connected to each others wherein the method comprises:

the provider edge establishing a VPLS table used to transmit a received Ethernet frame to a destination, and the management system establishing a management table used to accurately transmit the Ethernet frame to the destination;

after the provider edge receives an Ethernet frame from the customer edge, searching the VPLS table in order to determine whether or not group information related to the destination of the Ethernet frame exists in the VPLS table;

if the group information does not exist, requesting the group information from the management system, receiving the information, and then, updating the VPLS table by adding the received group information; and the provider edge determining an output interface by referring to the group information, and transmitting the Ethernet frame;

wherein the requesting, receiving and updating of the group information comprise:

determining whether or not the group information request of the provider edge relates to the ICMP packet received by the provider edge;

if the request relates to the ICMP packet, transmitting to the provider edge a corresponding group ID in the management table; and notifying all customer edges having an identical group ID in the management table of customers in the identical group.

* * * * *